United States Patent [19]
Brown et al.

[11] Patent Number: 5,570,837
[45] Date of Patent: Nov. 5, 1996

[54] PROGRAMMABLE DIGITAL THERMOSTAT WITH MEANS FOR ENABLING TEMPORARY CONNECTION OF A BATTERY THERETO

[75] Inventors: Bernard T. Brown, St. Louis County; David L. Perry; Horst E. Jaeschke, both of Jefferson County; Krishna H. Patil, St. Louis County, all of Mo.

[73] Assignee: Emerson Electric Co., St. Louis, Mo.

[21] Appl. No.: 544,022

[22] Filed: Oct. 18, 1995

[51] Int. Cl.$^6$ ............................. F23N 5/20; H02J 7/00
[52] U.S. Cl. .................................. 236/46 R; 307/66
[58] Field of Search .................... 236/46 R; 165/12; 307/66; 365/229

[56] References Cited

U.S. PATENT DOCUMENTS 4,963,811  10/1990  Weber ................................ 307/66 X
5,460,327  10/1995  Hill et al. ........................... 307/66 X

*Primary Examiner*—William E. Wayner
*Attorney, Agent, or Firm*—Paul A. Becker, Sr.

[57] ABSTRACT

A programmable digital thermostat is adapted to be powered by the conventional AC power source to which the thermostat is normally connected when installed in a dwelling. The thermostat has no provision for mounting a battery therein. Means are provided for enabling a temporary connection of a battery to the thermostat to provide power for programming the thermostat so as to enable the user to program the thermostat before installing it.

5 Claims, 1 Drawing Sheet

PROGRAMMABLE DIGITAL THERMOSTAT WITH MEANS FOR ENABLING TEMPORARY CONNECTION OF A BATTERY THERETO

BACKGROUND OF THE INVENTION

A desired feature of a programmable digital thermostat is that it be programmable by the user prior to installing it on the wall and connecting it in the thermostat circuit. Another desired feature is that it contain a backup power source effective to retain the programmed time-temperature schedule in the event that after the thermostat is installed, the normal power source in the thermostat circuit is removed or becomes ineffective.

In some thermostats, both such features are provided by a battery (or several batteries) mounted within the thermostat. A battery also enables maintaining real time. A battery, however, has certain disadvantages. For example, it requires mounting space, sometimes a significant amount, within the thermostat. Thus, the thermostat is sometimes larger than desired in physical size because of the included battery. Also, the battery should be replaced periodically. Such replacement is an inconvenience and an added cost to the user.

In some thermostats, instead of a battery, a large capacitance capacitor, typically, an electric double layer capacitor, is used. The capacitor provides the desired backup power source. The capacitor also enables maintaining real time.

In some thermostats, instead of using a backup power source to retain memory, memory is retained by using an electrically erasable programmable read-only memory (EEPROM) chip. An EEPROM chip is a memory device, not a power source. While the chip requires no power to maintain memory, it does require power to effect a change to the memory. Typically, such thermostats also include a small capacitance capacitor for maintaining real time.

A particular disadvantage of those thermostats not utilizing a battery is that they cannot be programmed by the user prior to installation. Specifically, whereas a battery has an inherent output voltage to provide power to the thermostat so as to enable such prior programming, a capacitor has no output voltage until it is charged. Also, as noted above, an EEPROM chip requires power to effect a change to its memory.

SUMMARY OF THE INVENTION

A primary object of this invention is to provide a generally new and improved programmable digital thermostat having means therein for enabling temporary connection of a battery to the thermostat so as to enable the user to program the thermostat prior to installing it.

In accordance with a preferred embodiment of the present invention, a programmable digital thermostat includes a base assembly comprising a base member and a printed circuit board. The circuit board contains various components including a microcomputer and a power supply connected to the microcomputer. Prior to installation of the thermostat on the wall, a pair of contact means in the form of wire jumpers is accessible through an opening in the base member. When it is desired to program the thermostat, a 9-volt battery is inserted into a recess in the base member so that the battery terminals extend through the opening in the base member and make contact with the contact means. After approximately thirty seconds, a capacitor in the power supply is sufficiently charged by the battery to initialize the microcomputer and to keep it powered for approximately one hour. The 9-volt battery is removed after the thirty seconds. Thus, a period of approximately one hour is provided to enable programming the thermostat or at least to enable demonstrating the method of programming prior to installing the thermostat on the wall. When the thermostat is subsequently installed, the capacitor is charged by the AC power source of the thermostat circuit and provides a backup power source.

The above mentioned and other objects and features of the present invention will become apparent from the following description when read in conjunction with the accompanying drawings.

DESCRIPTION OF THE PREFERRED EMBODIMENT

Figure 1:
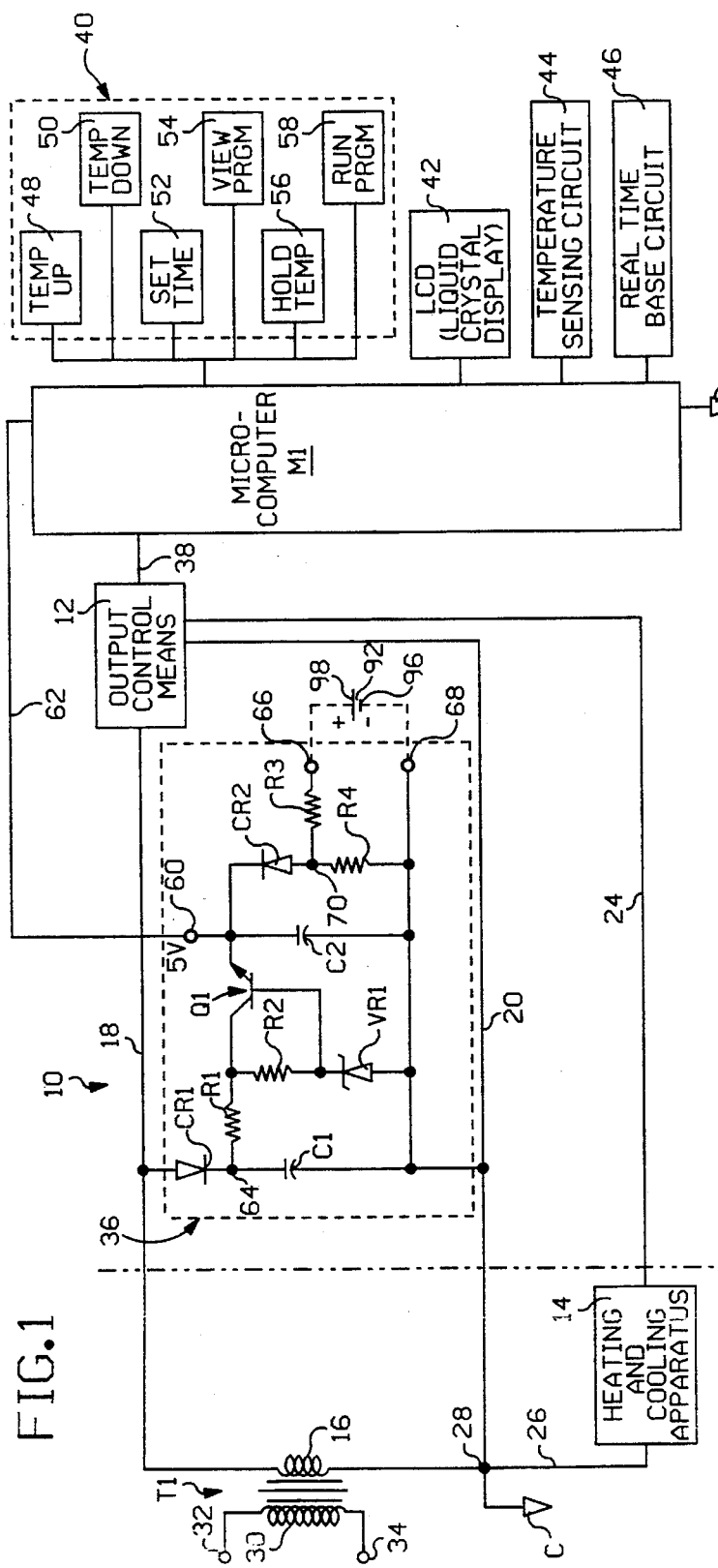
FIG. 1 is a schematic illustration, largely in block form, of a programmable digital thermostat incorporating the present invention and shown connected to heating and cooling apparatus.

Referring to FIG. 1, a programmable digital thermostat constructed in accordance with the present invention is shown generally at 10. Thermostat 10 is adapted to control, through its output control means 12, operation of heating and cooling apparatus 14. Apparatus 14 can take many forms, a typical one of which comprises a heat pump system which includes various relays for controlling a changeover valve, a circulator fan, an auxiliary source of heat and an emergency source of heat, and a contactor for controlling a compressor. Output control means 12 can also take many forms, a typical one of which includes relays, a system selector switch and a fan switch.

Output control means 12 is connected across the secondary winding 16 of a voltage step-down transformer T1 through a first circuit comprising leads 18 and 20, and through a second circuit comprising leads 18, 24, heating and cooling apparatus 14 and a lead 26. While lead 24 is shown as a single lead, it is to be understood that it comprises a number of leads leading to the various components in heating and cooling apparatus 14. The junction 28 of leads 20 and 26 and one end of secondary winding 16 is connected to chassis common C. The primary winding 30 of transformer T1 is connected across terminals 32 and 34 of a conventional 120 volt AC power source. A power supply 36 is also connected by leads 18 and 20 across secondary winding 16.

Thermostat 10 includes a microcontroller in the form of a microcomputer M1. Preferably, microcomputer M1 is an NEC μPD7503 device. Microcomputer M1 is connected by connecting means 38 to output control means 12. Typically, connecting means 38 comprises a plurality of electrical leads, some of which are connected to input pins of microcomputer M1 so as to enable microcomputer M1 to receive signals from output control means 12 such as signals relating to system switch selection, and some of which are connected to output pins of microcomputer M1 so as to enable microcomputer M1 to provide output signals for controlling operation of output control means 12 in accordance with logic programmed into and executed by microcomputer M1.

Connected to microcomputer M1 are a plurality of buttons and/or keys indicated generally at 40, an LCD 42 (liquid crystal display), a temperature sensing circuit 44 and a real time base circuit 46.

The plurality of buttons and/or keys 40, hereinafter referred to as buttons, comprises individual buttons 48, 50, 52, 54, 56 and 58 identified as TEMP UP, TEMP DOWN, SET TIME, VIEW PRGM, HOLD TEMP and RUN PRGM, respectively. Buttons 40 provide means for enabling the user to program microcomputer M1 so as to establish a desired time-temperature schedule of operation of thermostat 10.

LCD 42 provides a plurality of display elements for designating time and temperature plus various other information. Temperature sensing circuit 44 includes a thermistor (not shown) in circuit with an oscillator (not shown), the output frequency of which is a function of the ambient temperature sensed by the thermistor. The output frequency is measured by microcomputer M1 and converted to a measurement of degrees of temperature. Real time base circuit 46 includes a crystal oscillator (not shown) and provides an accurate time base for all real time functions.

Power supply 36 is effective to provide a voltage of approximately 5 volts at an output terminal 60 which is connected to microcomputer M1 by a lead 62. Power supply 36 includes an NPN transistor Q1 having its collector connected through a current limiting resistor R1 to the cathode of a controlled rectifier CR1 whose anode is connected to lead 18. The emitter of transistor Q1 is connected to output terminal 60. A current limiting resistor R2 is connected between the collector and base of transistor Q1. A capacitor C1 is connected between lead 20 and the junction 64 of resistor R1 and rectifier CR1. A voltage regulator VR1 is connected between the base of transistor Q1 and lead 20. An electric double layer capacitor C2 is connected between output terminal 60 and lead 20. Connected in series between a pair of contact members 66 and 68 are resistors R3 and R4. Contact member 68 is connected to lead 20. The anode of a controlled rectifier CR2 is connected to the junction 70 of resistors R3 and R4, and the cathode thereof is connected to output terminal 60. In the preferred embodiment, each contact member 66 and 68 comprises a wire jumper in a printed circuit board 69 as shown in FIGS. 2 and 3, which board 69 also carries the various circuit components of power supply 36 to which contact members 66 and 68 are connected.

Figure 2:
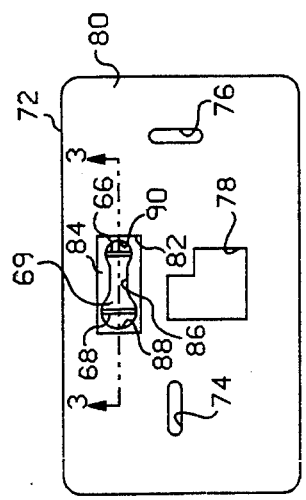
FIG. 2 is a rear elevation view of the base assembly of the thermostat of FIG. 1.

Referring to FIG. 2, thermostat 10 includes a base member 72 having openings 74, 76 and 78 therein. Openings 74 and 76 are adapted to receive screws (not shown) for attaching base member 72 to a wall. Opening 78 provides an opening for leads 18, 20 and 24 leading from transformer T1 and heating and cooling apparatus 14 through the wall to thermostat 10. The rear surface 80 of base member 72, the surface in contact with the wall when thermostat 10 is installed, has a rectangular recess 82 therein. Recess 82 has a bottom wall 84 with an elongated opening 86 therein, one end 88 of opening 86 being slightly larger than the other end 90 of opening 86.

Figure 3:
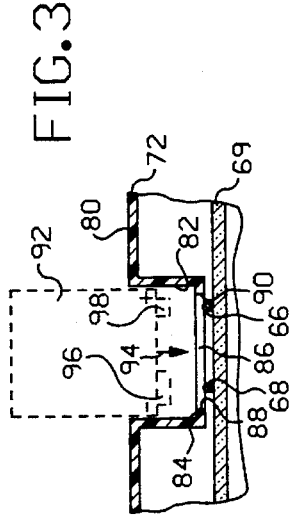
FIG. 3 is an enlarged cross-sectional view of a portion of the thermostat base assembly taken generally along line 3—3 of FIG. 2 and showing a 9-volt battery in phantom.

Referring to FIG. 3, a conventional 9-volt battery 92 is shown in phantom and is shown being inserted in the direction indicated by arrow 94. When battery 92 is inserted as far as it can be inserted in recess 82, its negative terminal 96 makes contact with contact member 68, and its positive terminal 98 makes contact with contact member 66. Negative terminal 96 is slightly larger than positive terminal 98.

End 88 of opening 86 is sufficiently large to enable negative terminal 96 to pass through it; end 90 of opening 86 is sufficiently large to enable positive terminal 98 to pass through it but not to enable negative terminal 96 to pass through it. This hole-size, terminal-size relationship ensures that when battery 92 is inserted into recess 82, it cannot be connected in the wrong polarity to the circuitry in power supply 36. As will be described hereinafter, battery 92 is removed after a short time period.

It is to be understood that the temporary connection between power supply 36 and battery 92 could be provided by various other means, such as the various snap-on connectors utilized in devices powered by a 9-volt battery. It is to be further understood that the construction described herein for enabling the temporary connection could be modified to accept batteries other than the conventional 9-volt battery 92.

When thermostat 10 is removed from its packaging, capacitor C2 in power supply 36 is in a state of discharge. The voltage at output terminal 60 is zero so that power supply 36 provides no electrical power to microcomputer Mi. Under this condition, microcomputer M1 is disabled.

When there is no desire to program thermostat 10 prior to installing it on the wall, microcomputer M1 remains disabled until thermostat 10 is installed. When installed, thermostat 10 is connected to transformer T1 and to heating and cooling apparatus 14. When so connected, voltage regulator VR1 limits the voltage between the base of transistor Q1 and common C to approximately 5.6 volts. Resistor R2 limits the base current and resistor R1 limits the emitter-collector current. Capacitor C1 is a filter capacitor. With this construction, power supply 36 provides a 5-volt source at its output terminal 60 which is connected to microcomputer Mi. When this 5-volt source is provided, microcomputer M1 is enabled whereby thermostat 10 can then be programmed.

Power supply 36 also includes capacitor C2 which is charged through transistor Q1 to the 5-volt level of output terminal 60. In the event of an AC power failure, capacitor C2, when fully charged, can maintain the voltage at output terminal 60 at a voltage level adequate to keep microcomputer M1 enabled for approximately 2 hours. It is noted that capacitor C2 is the sole backup power source.

When it is desired to program or at least demonstrate the method of programming thermostat 10 prior to installing it in the wall, the 9-volt battery 92 is inserted into recess 82 as previously described and held in that position for approximately 30 seconds and then battery 92 is removed. In the preferred embodiment, resistor R3 is 180 ohms, resistor R4 is 330 ohms, and capacitor C2 is 0.047 farads. With such values, the voltage at junction 70 is slightly less than 6 volts and the 30-second time period comprises several time constants. It is to be understood that other time periods and other resistance and capacitance values could be utilized. After the 30-second contact with battery 92, capacitor C2 is sufficiently charged to provide sufficient voltage, approximately 5 volts, at output terminal 60 to initialize microcomputer M1 and to keep it powered for approximately one hour.

Therefore, a time period of approximately one hour is provided to enable programming thermostat 10 or at least to enable demonstrating the method of programming prior to installing thermostat 10 on the wall.

Such programming comprises setting the current time and establishing a desired time-temperature schedule of operation. Such programming is accomplished by manipulating buttons 40.

For example, to set the current time and day, SET TIME button 52 is pressed; TEMP UP button 48 or TEMP DOWN button 50 is pressed to increment or decrement, respectively, the hour until the current hour is displayed in LCD 42. SET TIME button 52 is pressed again; TEMP UP button 48 or TEMP DOWN button 50 is pressed to increment or decrement, respectively, the minute until the current minute is displayed. SET TIME button 52 is pressed again; TEMP UP button 48 or TEMP DOWN button 50 is pressed to increment or decrement, respectively, the day until the current day of the week is displayed.

Thermostat 10 is preprogrammed with specific starting times and setpoint temperatures to be maintained starting at each starting time. A 24-hour time span is divided into time periods designated first, second, third and fourth. The preprogrammed schedule for heating, for each day of the week, is: first period, 68° F. beginning at 6:00 a.m.; second period, 68° F. beginning at 8:00 a.m.; third period, 68° F. beginning at 5:00 p.m.; and fourth period, 64° F. beginning at 10:00 p.m. The preprogrammed schedule for cooling, for each day of the week, is: first period, 78° F. beginning at 6:00 a.m.; second period 82° F. beginning at 8:00 a.m.; third period, 78° F. beginning at 5:00 p.m.; and fourth period, 78° F. beginning at 10:00 p.m.

Typically, the user will desire a time-temperature schedule somewhat different from the preprogrammed schedule. For example, assume that for heating, the desired schedule, for each day of the week, is: first period, 70° F. beginning at 6:30 a.m.; second period, 66° F. beginning at 8:00 a.m.; third period, 70° F. beginning at 4:00 p.m.; and fourth period, 62° F. beginning at 11:00 p.m. To accomplish this programming, the system selector switch in output control means 12 is switched to the heating mode. The VIEW PRGM button 54 is pressed. The LCD 42 displays an indication that this is a weekday program, and displays the starting time of 6:00 a.m. and the setpoint temperature of 68° F. for the first period. The TEMP UP button 48 is pressed to increment the setpoint temperature until the desired setpoint of 70° F. is displayed. The SET TIME button 52 is pressed and then the TEMP UP button 48 is pressed to increment the starting time until the desired starting time of 6:30 a.m. is displayed. In this same manner, the desired starting times and setpoint temperatures are set for the second, third and fourth periods. After the fourth period is programmed and the VIEW PRGM button 54 is pressed again, LCD 42 displays an indication that this is a weekend program. In the same manner, the desired times and temperatures are set for the first, second, third and fourth periods of a weekend program. It is to be understood that, while the weekend program is the same as the weekday program in the instant example, they can be different.

To program thermostat 10 for cooling, the system selector switch in output control means 12 is switched to the cooling mode. The desired values of starting times and setpoint temperatures are then established using the same procedure as previously described for the heating schedule.

While the programming of thermostat 10 described herein is not difficult, it does require a relatively large number of manipulations of buttons 40 and visual observations of LCD 42 during programming. It is noted that sometimes the wall on which the thermostat is mounted is in a relatively dark hallway, and sometimes the thermostat 10 is mounted at a height which makes it physically awkward to manipulate buttons 40 and visually observe LCD 42. Because of the feature described herein of being able to temporarily connect battery 92 so as to provide power to thermostat 10 by means other than connecting thermostat 10 to the AC source of the thermostat circuit, such programming can be performed, or at least demonstrated, in a more suitable environment than that which exists when thermostat 10 is mounted on the wall.

It is to be understood that there are other thermostat constructions that can also incorporate the present invention. For example, an EEPROM chip can be used to store the time-temperature schedule. Preferably, a capacitor would be used in conjunction with the EEPROM chip. Battery 92 would either provide power directly to the EEPROM chip to effect a desired change in the time-temperature schedule stored therein, or it would charge the capacitor to effect such desired change. If maintaining real time were not required, the capacitor could be omitted. If the capacitor were omitted, the battery then would provide the sole power source for the EEPROM until the thermostat was installed so that battery 92 would need to be connected to contacts 66 and 68 until the user programming, prior to installation, was completed.

While the invention has been illustrated and described in detail in the drawings and foregoing description, it will be recognized that many changes and modifications will occur to those skilled in the art. It is therefore intended, by the appended claims to cover any such changes and modifications as fall within the true spirit and scope of the invention.

We claim:

1. In a programmable digital thermostat adapted to be powered by an AC power source to which the thermostat is connected when installed in a dwelling, the thermostat having no provision for mounting a battery therein, the improvement comprising means for enabling temporary connection of a battery to said thermostat to provide power for programming said thermostat prior to installation.

2. In a programmable digital thermostat utilizing a microcomputer normally powered by an AC power source, and a capacitor normally charged by the AC power source for providing a sole backup power source for the microcomputer in the event of a failure of the AC power source, the thermostat having no provision for mounting a battery therein, the improvement comprising means for enabling temporary connection of a battery to said thermostat to effect charging of said capacitor so as to enable said capacitor to provide power for programming said thermostat prior to installation.

3. In a programmable digital thermostat utilizing a microcomputer adapted to be powered by a primary power source comprising an AC power source and by a sole backup power source comprising a capacitor, the capacitor being initially uncharged and adapted to be charged by the AC power source when the capacitor is connected to the AC power source, the thermostat having no provision for mounting a battery therein, the improvement comprising means for enabling temporary connection of a battery to said capacitor to enable said capacitor to be charged by said battery to a voltage value adequate to power said microcomputer so as to enable said microcomputer to be programmed prior to connecting said microcomputer to said primary power source.

4. The thermostat claimed in claim 3 wherein said means for enabling temporary connection of a battery to said capacitor includes a pair of contact members on a printed circuit board, said contact members being exposed through an opening in a base member of said thermostat for enabling the terminals of said battery to make contact with said contact members, and said contact members being connected through resistor and rectifier means to said capacitor.

5. The thermostat claimed in claim 4 wherein each of said contact members comprises a wire jumper.

* * * * *